United States Patent
Bayer

(10) Patent No.: US 11,891,028 B2
(45) Date of Patent: Feb. 6, 2024

(54) METHOD FOR OPERATING A VEHICLE COMPRISING AN ELECTRO-HYDRAULIC BRAKE SYSTEM, AND ELECTRO-HYDRAULIC BRAKE SYSTEM OF A VEHICLE

(71) Applicant: Bayerische Motoren Werke Aktiengesellschaft, Munich (DE)

(72) Inventor: Christof Bayer, Markt Indersdorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 502 days.

(21) Appl. No.: 17/048,827

(22) PCT Filed: Apr. 10, 2019

(86) PCT No.: PCT/EP2019/059148
§ 371 (c)(1),
(2) Date: Oct. 19, 2020

(87) PCT Pub. No.: WO2019/206642
PCT Pub. Date: Oct. 31, 2019

(65) Prior Publication Data
US 2021/0146899 A1 May 20, 2021

(30) Foreign Application Priority Data
Apr. 27, 2018 (DE) ..................... 10 2018 206 586.1

(51) Int. Cl.
*B60T 13/66* (2006.01)
*B60T 13/62* (2006.01)
(Continued)

(52) U.S. Cl.
CPC .............. *B60T 13/62* (2013.01); *B60T 7/042* (2013.01); *B60T 7/06* (2013.01); *B60T 7/12* (2013.01);
(Continued)

(58) Field of Classification Search
CPC .......... B60T 13/745; B60T 7/06; B60T 7/065; B60T 13/62; B60T 13/686; B60T 7/042;
(Continued)

(56) References Cited

U.S. PATENT DOCUMENTS 3,373,661 A * 3/1968 Reichard ................. B60T 13/72
 92/76
9,266,507 B2 * 2/2016 Shand ....................... B60T 7/06
(Continued)

FOREIGN PATENT DOCUMENTS

DE  10 2006 015 906 A1  7/2007
DE  10 2013 225 809 A1  8/2014
(Continued)

OTHER PUBLICATIONS

International Search Report (PCT/ISA/210) issued in PCT Application No. PCT/EP2019/059148 dated Jul. 9, 2019 with English translation (six (6) pages).
(Continued)

*Primary Examiner* — Bradley T King
(74) *Attorney, Agent, or Firm* — Crowell & Moring LLP

(57) ABSTRACT

Please substitute the new Abstract submitted herewith for the original Abstract:
The invention relates to operating a vehicle having an electro-hydraulic brake system. The vehicle can be operated in a manual and an autonomous driving mode. The brake system is divided into a first and a second hydraulic brake circuit. The two brake circuits can be hydraulically decoupled from one another by a circuit separating valve. The two brake circuits are each assigned to hydraulically enable at least one respective wheel brake of the vehicle. A brake pedal is brought into an at least partially actuated position during an autonomous driving mode.

12 Claims, 2 Drawing Sheets

(51) Int. Cl.
  *B60T 7/04* (2006.01)
  *B60T 7/06* (2006.01)
  *B60T 7/12* (2006.01)
  *B60T 8/17* (2006.01)
  *B60T 13/68* (2006.01)
  *B60K 26/02* (2006.01)
  *B60T 8/40* (2006.01)

(52) U.S. Cl.
  CPC .............. *B60T 8/17* (2013.01); *B60T 13/686* (2013.01); *B60K 26/02* (2013.01); *B60K 2026/026* (2013.01); *B60T 8/4081* (2013.01); *B60T 2270/402* (2013.01); *B60T 2270/404* (2013.01); *B60T 2270/82* (2013.01)

(58) Field of Classification Search
  CPC .... B60T 7/12; B60T 8/4081; B60T 2270/402; B60T 2270/404; B60T 2270/82; B60R 21/09; B60K 26/02; B60K 2026/026
  See application file for complete search history.

(56) References Cited

U.S. PATENT DOCUMENTS

| | | | |
|---|---|---|---|
| 10,717,420 B2* | 7/2020 | Beauvais | B60T 13/662 |
| 10,889,226 B1* | 1/2021 | Dean | B60T 7/06 |
| 11,414,057 B2* | 8/2022 | Ghaffari | G05D 1/0061 |
| 2010/0259096 A1 | 10/2010 | Rieth et al. | |
| 2011/0238267 A1* | 9/2011 | Cetinkaya | B60T 7/22 |
| | | | 701/83 |
| 2015/0137492 A1* | 5/2015 | Rao | B62D 1/183 |
| | | | 280/732 |
| 2015/0142273 A1* | 5/2015 | Cuddihy | B60N 2/0232 |
| | | | 296/65.01 |
| 2015/0253804 A1 | 9/2015 | Baur et al. | |
| 2016/0023644 A1 | 1/2016 | Feigel et al. | |
| 2017/0282877 A1 | 10/2017 | Besier et al. | |
| 2018/0186266 A1* | 7/2018 | Fitzpatrick | B60N 3/063 |
| 2018/0189716 A1* | 7/2018 | Crone | G06Q 10/083 |
| 2019/0176785 A1* | 6/2019 | Hansmann | B60T 13/686 |
| 2019/0344769 A1* | 11/2019 | Zimmermann | B60T 8/326 |
| 2023/0150459 A1* | 5/2023 | Koeth | B60T 13/662 |
| | | | 303/113.1 |

FOREIGN PATENT DOCUMENTS

| | | |
|---|---|---|
| DE | 10 2013 012 750 A1 | 2/2015 |
| DE | 10 2015 201 540 A1 | 9/2015 |
| DE | 10 2014 225 958 A1 | 6/2016 |
| DE | 10 2015 015 839 A1 | 9/2016 |
| EP | 2 840 000 B1 | 2/2020 |
| KR | 10-2017-0137427 A | 12/2017 |

OTHER PUBLICATIONS

German-language Written Opinion (PCT/ISA/237) issued in PCT Application No. PCT/EP2019/059148 dated Jul. 9, 2019 (nine (9) pages).
German-language Office Action issued in German Application No. 10 2018 206 586.1 dated Feb. 1, 2019 (four (4) pages).
German-language Office Action issued in German Application No. 10 2018 206 586.1 dated Dec. 16, 2019 (three (3) pages).

* cited by examiner

METHOD FOR OPERATING A VEHICLE COMPRISING AN ELECTRO-HYDRAULIC BRAKE SYSTEM, AND ELECTRO-HYDRAULIC BRAKE SYSTEM OF A VEHICLE

BACKGROUND AND SUMMARY OF THE INVENTION

The present subject matter relates to a method for operating an electrohydraulic brake system, and to an electro-hydraulic brake system of a vehicle. With regard to the prior art, reference is made by way of example to DE 10 2006 015 906 A1 and DE 10 2015 201 540 A1.

Over the course of the development of brake systems, the original brake actuation has been supplemented by hydraulic brake pressure modulation, wherein, aside from improved controllability of the braking processes and an increase in driving stability using electronically controlled braking interventions, the negative pressure for a brake force booster is provided using a vacuum pump. With the emergence of hybrid and electric vehicles, so-called electrohydraulic brake systems have become more popular in vehicles, in particular in the motor vehicle sector.

In the case of presently known electrohydraulic brake systems, as presented in DE 10 2006 015 906 A1, the driver is decoupled from the actuation during normal operation, which is also known as a so-called brake-by-wire. Here, the braking operation at the individual wheel brakes is performed using external force generation, wherein the actuating device and transmitting device are decoupled from one another. In the conventional hydraulic brake system, the actuating device is the brake pedal and the transmitting device is the hydraulic system. This means that the muscle power of the driver by actuation of the brake pedal acts is used only at a fall-back level in the event of a failure of the brake-by-wire.

In the age of autonomous and highly automated driving, such brake-by-wire systems are used more and more. Aside from operation in the autonomous driving mode, it is sought to provide the driver with the possibility of still driving the vehicle manually by his or her self, for which reason it is likewise the case that a manual driving mode is provided in which the driver performs the driving task. The conventional brake pedal and the actuating function thereof therefore remains present in the vehicle.

In the autonomous driving mode, however, it is desirable for the driver to move as freely as possible in the vehicle, and at the same time to have the greatest possible amount of legroom. The brake pedal for the brake actuation in the manual driving mode may then be in the way, and restrict the driver in terms of his or her legroom in the autonomous driving mode.

DE 10 2015 201 540 A1 presents a method in which a foot-operated actuating device can be displaced away from the driver in the automated driving mode of a vehicle, and thus more legroom is created. Disadvantages of this are a complex device, which in turn takes up a large amount of structural space, and additional components which must be created and provided in order to realize the displacement mechanism of the brake pedal.

It is an object of the present subject matter to specify a method for operating an electrohydraulic brake system, and an electrohydraulic brake system which is used both in an autonomous and in a manual driving mode of a vehicle and which provides optimized legroom for a driver in the autonomous driving mode through minimal outlay in terms of implementation.

The object is achieved using a method for operating an electrohydraulic brake system of a vehicle and using an electrohydraulic brake system.

Here, a brake-by-wire brake system is presented, and a method for the operation thereof is presented.

A method for operating an electrohydraulic brake system of a vehicle is proposed, wherein the vehicle is operable both in a manual and in an autonomous driving mode.

An autonomous driving mode refers to autonomous driving (also referred to as automated or automatic driving) of the vehicle, which is to be understood to mean the propulsion of vehicles, mobile robots, and driverless transport systems, which behave substantially autonomously. Thus, in the autonomous driving mode, the vehicle performs the driving tasks and the secondary tasks associated therewith. In this specific example, the term "autonomous driving mode" relates to an autonomous braking operation. "Autonomous driving mode" thus likewise encompasses so-called highly automated or partially autonomous driving, in the case of which the vehicle performs not all, but most of the driving task and also performs the braking.

Here, during normal operation, both in the autonomous driving mode and in the manual driving mode, the electrohydraulic brake system preferably operates in a brake-by-wire function, with brake pressure generation controlled by external power, in which the driver is decoupled from the actuation of the brake.

For example, during manual driving operation where the driver performs the driving and braking task, a brake pedal or a device equivalent thereto, when it is actuated by the driver, acts via a pedal rod on a master brake cylinder or on an actuating brake cylinder (also referred to as actuating cylinder). Here, firstly, the deceleration demand of the driver is detected electronically using a suitable sensor arrangement, and secondly, a hydraulic actuation of a pedal feel simulator is preferably performed. The pedal feel simulator may, for example, likewise constitute a pressure cylinder or else a spring arrangement which, in a brake-by-wire operating mode, provides the driver with feedback or a resistance for the purposes of feedback of the brake actuation. The pressure acting in a simulator chamber is in this case hydraulically independent of a pressure level in the wheel brakes, which is set by a, for example, electric-motor-powered drive.

The actual brake pressure required for the braking of the wheel brakes is generated using a hydraulic pressure source or pressure provision device, which is controlled in open-loop or closed-loop fashion by an electronic open-loop and closed-loop control unit, and a pressure valve arrangement of the brake system.

Here an electric motor serves as drive or as pump. Here, in an electrically controlled manner, preferably the electric motor moves a working piston of an actuator cylinder (the hydraulic pressure source) for the purposes of generating brake pressure.

The level of the brake pressure is determined from calculations by the electronic open-loop and closed-loop control unit, which converts the driver demand detected by a sensor arrangement arranged at the pedal rod into a setpoint pressure at the hydraulic pressure source or at the pressure provision device and the pressure control valve arrangement at the individual wheel brakes. Thus, if the driver actuates the brake pedal (or a suitable actuating device), it is, for example, the case that the travel and the pressure of this action are identified by sensor arrangements at the pedal rod. The electrically controlled pressure control unit is subsequently controlled in accordance with such a specification by the driver.

In the autonomous driving mode of the vehicle, if the vehicle (at least partially) performs the driving task, the preferred brake-by-wire closed-loop pressure control is performed in a manner dependent on data from a multiplicity of different vehicle sensor arrangements.

In the event of a disruption to the brake-by-wire function, for example, if a fault or a failure of the power supply occurs, the electrohydraulic brake system preferably comprises a fall-back level. Here, it is preferably the case that separating valves or circuit-separating valves, which hydraulically decouple the driver from the wheel brakes during the actuation during normal operation (in the brake-by-wire mode), are opened. The driver is thus hydraulically coupled directly to the wheel brakes via the master brake cylinder which is actuatable using the brake pedal. Here, for example, the hydraulic fluid which has been displaced by the actuating cylinder or by the master brake cylinder into the pedal feel simulator in the brake-by-wire operating mode is utilized, with the aid of the hydraulic pressure source, for applying the brake pressure.

It is furthermore provided that, in the autonomous driving mode of the vehicle, the brake pedal is held in an (at least partially) actuated position.

An "actuated position" is to be understood here to mean a position of the brake pedal (or of a similar actuating device), which is present if the brake pedal is actuated by the driver and, in the case of a deceleration demand, said driver, using his or her foot and exerting muscle power, displaces or pushes the brake pedal away from them at least approximately in the direction of the front of the vehicle in the customary manner. Here, the brake pedal is customarily likewise displaced forward using a transverse displacement of the pedal rod in the direction of the front of the vehicle.

Here, the brake pedal does not imperatively need to be pushed through as far as its mechanical stop, but may also be pushed through only part of its range or only partially actuated, such that it is not at its mechanical stop.

In order to hold the brake pedal in the actuated position during an active autonomous driving mode, it is, for example, possible for said brake pedal to be mechanically locked. On the other hand, it is likewise possible for the pedal to be hydraulically held in the actuated position using the electrohydraulic brake system.

It is likewise preferable to provide a manually actuatable device, for example, a retraction spring, via which the brake pedal can be brought back into a non-actuated position. This is necessary, for example, if the vehicle transitions from an autonomous driving mode into a manual driving mode and the driver resumes the driving task in such a manual driving mode.

Using the actuated position of the brake pedal, the driver can be provided with additional freedom and space during driving in the autonomous driving mode of the vehicle.

The actuation of the brake pedal upon initiation or identification of an autonomous driving mode may in this case be performed, for example, by a driver by bringing the brake pedal into the actuated position using his or her muscle power. It is, however, alternatively also possible for an additional actuator to be arranged at the brake pedal, which additional actuator, in the event of an autonomous driving mode being detected, is controlled, and enabled to bring the brake pedal into an actuated position by a control unit.

Furthermore, in an example embodiment of the present subject matter, a mechanical coupling MC of the brake pedal P to an accelerator pedal A is provided. This mechanical coupling MC is designed such that, during a movement of the brake pedal P, the accelerator pedal A is moved conjointly into the actuated position. Thus, in the autonomous driving mode of the vehicle, the accelerator pedal A is held in an actuated position in the same way as the brake pedal P. If the vehicle is in a manual driving mode, it is thus, for example, possible for the accelerator pedal A to be mechanically decoupled from the brake pedal P. It is however equally possible for the actual braking or acceleration intervention, which are both controlled by external power, to be initiated using an intelligent open-loop and/or closed-loop control, without the mechanical coupling MC being eliminated.

Such a mechanical coupling MC of the brake pedal P to the accelerator pedal A makes even greater legroom possible for the vehicle driver during autonomous travel of the vehicle.

As already mentioned above, such an electrohydraulic brake system is configured such that, in the presence of a manual braking demand from the driver by actuation of the brake pedal, a braking intervention occurs. In the case of the brake pedal being folded away in an autonomous driving mode, a braking operation is however not desired. In order to prevent a braking operation or a vehicle deceleration during the movement of the brake pedal into an actuated position in an autonomous driving mode, the electrohydraulic brake system, in particular the brake-by-wire brake system, is operated with the following steps, or, for the folding-away of the brake pedal, set into the following state:

In the starting position, when the electrohydraulic brake system is in the normal operating mode, the actuating brake cylinder or the actuating cylinder is hydraulically decoupled from the wheel brakes, or couplable only for a fall-back level, using, for example, an actuating valve. Instead, the stated hydraulic pressure source is hydraulically connected to the respective wheel brakes, for example, using a suitable valve, and is controlled by an open-loop and/or closed-loop control unit.

Here, the brake system is divided into two brake circuits, a brake circuit of the front-wheel brakes and a brake circuit of the rear-wheel brakes. Here in each case, at least one different wheel brake of the vehicle is enabled by in each case one of the two brake circuits.

This means that a first brake circuit produces a hydraulic circuit with at least one-wheel brake of the vehicle, for example, the two rear-wheel brakes, and a hydraulic pressure source (for the autonomous driving mode) and/or an actuating cylinder which is controlled by the brake pedal (for a manual driving mode or a fall-back level).

Then, a second brake circuit produces, for example, a hydraulic circuit with at least one different wheel brake, for example, the two front-wheel brakes of the vehicle, and a hydraulic pressure source and/or the actuating cylinder.

As an alternative to the brake circuits being split into front wheels and rear wheels (also referred to as so-called black-white split), it is also possible for the brake circuits to be coupled into in each case one left-hand or right-hand front wheel with one left-hand or right-hand rear wheel respectively (also referred to as so-called diagonal split or x-split) and for two brake circuits to thus be generated.

The system furthermore preferably comprises a so-called circuit-separating valve, which can hydraulically decouple the two brake circuits from one another. The two brake circuits are thus operable independently and separately from one another. It is thus possible, for example, for the vehicle to be operated such that only the first brake circuit, for example, the rear-wheel brakes of the vehicle, are operated during a braking process, whereas the second brake circuit, for example, the front-wheel brakes of the vehicle, are separated by the circuit-separating valve and are not operated.

Here, in one step, provision is made for the first brake circuit of the brake system to be separated from the second brake circuit, for example, by switching of an above-stated circuit-separating valve into a closed position. For example, the first brake circuit constitutes the hydraulic circuit with the rear-wheel brakes of the vehicle, and the second brake circuit constitutes the hydraulic circuit with the front-wheel brakes of the vehicle.

In the case of a preferred use of a two-piston actuating cylinder, it is, for example, the case that the first brake circuit, which hydraulically connects a first pressure chamber of the actuating cylinder to two wheel brakes of the vehicle, is referred to as so-called pressure rod circuit. The second brake circuit, which hydraulically connects the second pressure chamber of a two-piston actuating cylinder to two further wheel brakes of the vehicle, is then referred to as so-called floating-piston circuit.

It is however also possible to use a single-piston actuating cylinder.

Here, it is furthermore preferably provided that the brake circuit of the front-wheel brakes is hydraulically separated from the brake circuit of the rear-wheel brakes.

In the next step, it is provided that the second brake circuit, the circuit of the front-wheel brakes, is hydraulically separated from the actuating cylinder. Such a hydraulic separation may be realized, for example, using the circuit-separating valve. It is however also possible to use a separate valve or some other suitable means for decoupling.

In a next step, it is provided that a hydraulic connection is produced between the first brake circuit and a hydraulic pressure source which is controllable by a control unit. For this purpose, an actuating valve may be switched into an electrically energized or opened state to make or break a hydraulic connection between the actuating cylinder and the first brake circuit, in particular, the circuit of the rear-wheel brakes of the vehicle.

Thus, the first brake circuit, in particular the rear-wheel brakes of the vehicle, is activated using the actuating cylinder. The actuating brake cylinder, which is actuatable by the brake pedal, is thus hydraulically coupled to one brake circuit (in particular, that of the rear-wheel brakes), while the other brake circuit (in particular that of the front-wheel brakes) is hydraulically decoupled from the actuating cylinder.

The second brake circuit, in particular the front-wheel brakes of the vehicle, is at this point thus hydraulically separated from the actuating cylinder.

In a next step, it is provided that the hydraulic connection of the first brake circuit is separated from the hydraulic pressure source which is controllable by a control unit.

It is furthermore provided that a so-called outlet valve is connected upstream of each wheel brake. The outlet valves, which are assigned to the brake circuit which is hydraulically coupled to the actuating cylinder, to the first brake circuit, to the circuit with the rear-wheel brakes, are in this case switched into an opened state. Such an outlet valve, in the opened or electrically energized state, produces a hydraulic connection between the respective wheel brake of a brake circuit, in this case preferably between the two rear-wheel brakes, and a brake fluid vessel. Accordingly, the brake fluid is conducted, before passing into the wheel brake, with the outlet valve open, into the brake fluid vessel rather than into the wheel brake. The brake fluid is discharged via the outlet valve.

Here, a pressure chamber, assigned to the first brake circuit, of the actuating cylinder is evacuated of hydraulic fluid. In the case of a two-piston actuating cylinder with two pressure chambers, the first pressure chamber is evacuated.

In the case of a single-piston actuating cylinder, the single pressure chamber with hydraulic fluid is evacuated because of the actuation of the brake pedal into an actuated position, without a noticeable vehicle deceleration occurring.

If, for example, upon identification of an autonomous driving mode of the vehicle, the brake pedal is moved (by the driver or by a controlled actuator) into an actuated position, then the hydraulic fluid or the brake fluid is conveyed from the actuating cylinder through, for example, the opened actuating valve through the activated or enabled first brake circuit, in particular through the brake circuit of the rear-wheel brakes, via the hydraulic connection to the outlet valve into the brake fluid vessel.

The brake pedal can thus be advantageously actuated without a braking intervention occurring.

In the case of a single-piston actuating cylinder, movement of the brake pedal into an actuated position is thus complete. The system can return into the starting position again. Here, in a next step, the brake pedal is arrested in the actuated position.

A braking operation or a noticeable vehicle deceleration as a result of the actuation of the brake pedal into an actuated position can thus be prevented.

In order to likewise evacuate the second pressure chamber, in the case of a two-piston actuating cylinder, without a noticeable vehicle deceleration occurring in the process, the method according to the present subject matter is performed, in effect, in a reversed form for the second brake circuit. For this purpose, subsequently to the method according to the present subject matter, the following steps are performed: separating the second brake circuit of the brake system from the first brake circuit, and separating the first brake circuit from the actuating cylinder which is actuatable using the brake pedal, and producing a hydraulic connection between the actuating cylinder and the wheel brakes assigned to the second brake circuit, and separating the hydraulic connection of the second brake circuit to a hydraulic pressure source which is controllable by a control unit, and switching the outlet valve assigned to each wheel brake of the second brake circuit into an opened position, which outlet valve produces a hydraulic connection between the at least one wheel brake and a brake fluid vessel, such that hydraulic brake fluid is conveyed from the actuating cylinder via the second brake circuit and via the opened outlet valve at the at least one wheel brake into the brake fluid vessel, and thus the pressure chamber of the actuating cylinder which is assigned to the second brake circuit is evacuated of hydraulic fluid.

Thus, the second pressure chamber in the case of a two-piston actuating cylinder is also evacuated, and the brake pedal is brought into an actuated position without a noticeable vehicle deceleration occurring.

Pressure control valves which are preferably arranged at each wheel brake of the vehicle are in this case preferably switched into an opened position. The pressure control valves control the brake pressure or the hydraulic pressure at the individual wheel brakes.

In order that the brake pedal remains in an actuated state during an activated autonomous driving mode, it is furthermore preferably provided that, after the pressure chamber or the pressure chambers of the actuating cylinder have been evacuated, the brake pedal is arrested in the actuated position.

Such arresting may be realized, for example, using a (mechanical or electrical) locking mechanism.

The hydraulic pressure source is not used in the case of the actuation of the brake pedal with the aim of folding the brake pedal away into the actuated position in an autonomous driving mode, when no braking of the vehicle is intended. However, if an autonomous braking intervention is necessary during the folding-away of the brake pedal into an actuated position, it is preferably provided that the second brake circuit which is hydraulically decoupled from the actuating cylinder using the preferred circuit-separating valve is hydraulically coupled to the hydraulic pressure source controllable by a control unit, and is thus enabled or activated. For this purpose, it is furthermore preferably provided that the first brake circuit is hydraulically decoupled from the hydraulic pressure source. It is thus possible for an autonomous braking intervention during the folding-away process or actuating process of the brake pedal into an actuated position to be performed using the second brake circuit, in particular using the brake circuit of the front-wheel brakes of the vehicle.

After the arresting of the brake pedal in the actuated position, the electrohydraulic brake system can be utilized or operated again, like the conventional brake system (in particular as a brake-by-wire brake system), in the autonomous driving mode.

In a further preferred configuration of the present subject matter, it is provided that, in the event of an activated manual driving mode of the vehicle being detected, the brake pedal is brought back into a non-actuated position, into its starting position, again. This is because, in the manual driving mode, it must be possible again for the driver to predefine the desired brake pressure or level of deceleration via the brake pedal.

As already mentioned further above, such repositioning may be performed manually, for example, via a lever or an unlocking action by the driver (or else in a manner controlled by external power via an actuator). For example, the brake pedal may be reset via a spring arrangement which is already present in the actuating cylinder. It is however also possible, if an actuator has already been used to move the brake pedal into the actuated position, for said actuator to simultaneously initiate an unlocking of the brake pedal, or for said actuator to set the brake pedal back into a non-actuated position again. For example, the brake pedal may be moved back into its non-actuated position via a force store element.

During the movement of the brake pedal into an actuated position in the autonomous driving mode of the vehicle, it is furthermore preferably provided that the brake pedal is brought into an actuated position with a maximum speed. Here, this maximum speed is determined from the built-up pressure at the wheel brakes with open outlet valve. Thus, the limit of the speed of the brake pedal into the actuated position is determined such that no noticeable vehicle deceleration occurs owing to an excessively high built-up pressure at the outlet valves of the wheel brakes of the first brake circuit. Specifically, if the maximum speed of the movement of the brake pedal is exceeded, a hydraulic fluid build-up at the outlet valves can occur, and the hydraulic fluid flows into the wheel brakes. A noticeable vehicle deceleration would then occur. This should advantageously be avoided.

Here, it is advantageously possible for a suitable limiting mechanism to be provided at the brake pedal, which limiting mechanism prevents an exceedance of the maximum speed of the brake pedal during the movement into the actuated position. If the brake pedal is brought into the actuated position via an actuator, then it is possible for a control unit to prevent an exceedance of the maximum speed through suitable control of the actuator.

A brake pedal which has been retracted or pulled in or actuated in accordance with the present subject matter in the autonomous driving mode of a vehicle provides the driver with greater legroom during autonomous travel.

These and further features emerge not only from the claims and from the description but also from the drawings, wherein the individual features may be realized in each case individually or severally in the form of sub-combinations in an embodiment of the present subject matter and form advantageous embodiments which are worthy of independent protection and for which protection is claimed here.

The present subject matter will be discussed in more detail below based on an example embodiment. Here, all of the features described in more detail can be essential to the present subject matter.

DETAILED DESCRIPTION OF THE DRAWINGS

Figure 1:
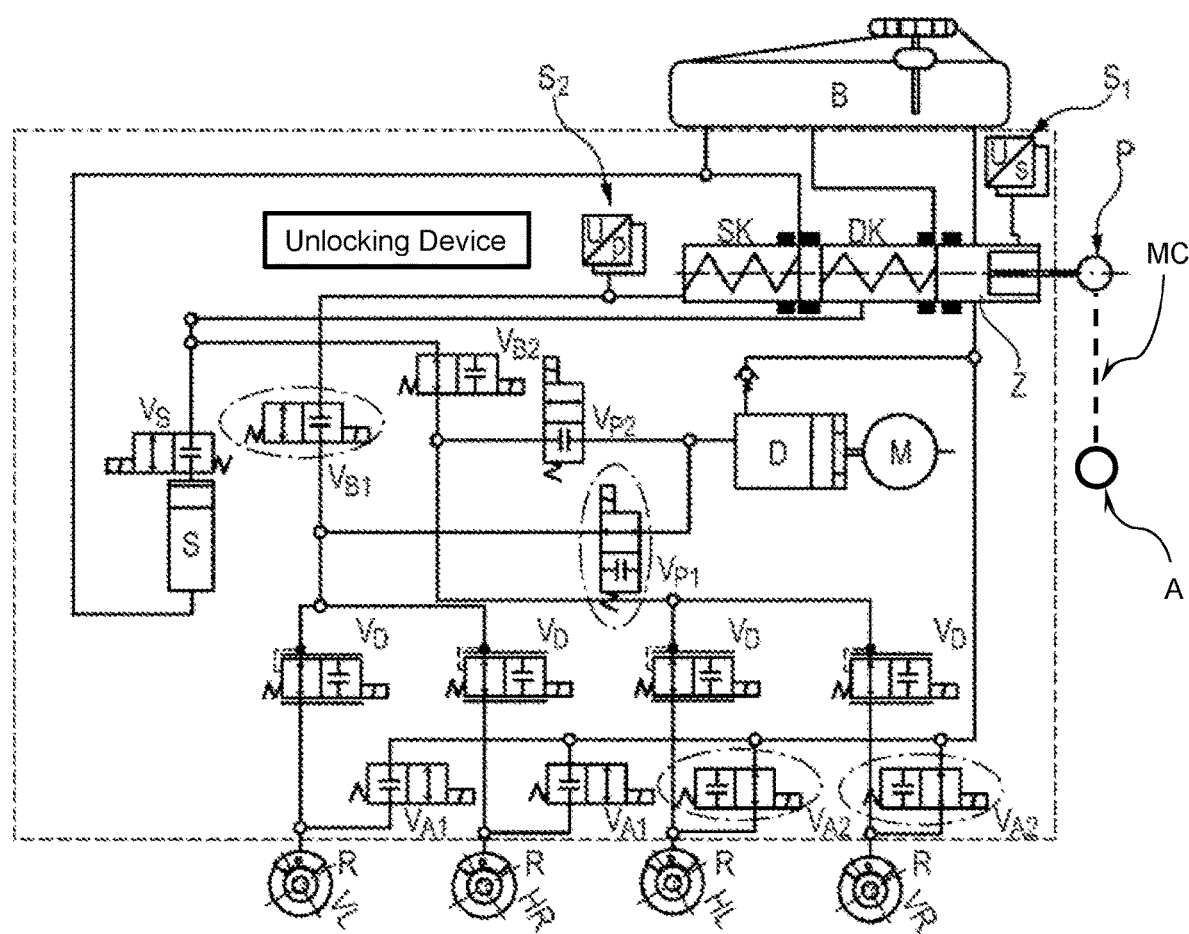
FIG. 1 schematically shows a circuit diagram of the layout of a brake circuit of an electrohydraulic brake system with a two-piston actuating cylinder during evacuation of the first pressure chamber of the actuating cylinder during the movement of the brake pedal into an actuated position, whereas FIG. 2 schematically shows a circuit diagram of the layout of a brake circuit of an electrohydraulic brake system with a two-piston actuating cylinder during evacuation of the second pressure chamber of the actuating cylinder.

The electrohydraulic brake system comprises in this case a two-piston actuating cylinder Z which is actuatable by a brake pedal P. The actuating cylinder Z again comprises two pressure chambers DK, SK, which each form a brake circuit. Thus, the system comprises a first and a second hydraulic brake circuit, which two brake circuits are hydraulically decouplable from one another via in each case one circuit-separating valve $V_m$, $V_{B2}$.

Here, each brake circuit can be hydraulically connected to two different wheel brakes R of the vehicle. The brake circuit of the first pressure chamber DK, also referred to as a so-called pressure rod circuit, is hydraulically assigned to the wheel brake $R_{HL}$ of the left-hand rear wheel of the vehicle and to the wheel brake $R_{VR}$ of the right-hand front wheel of the vehicle. Thus, the two wheel brakes $R_{HL}$, $R_{VR}$ can be hydraulically controlled and operated via the pressure rod circuit.

The second brake circuit of the second pressure chamber SK, which is also referred to as a so-called floating-piston circuit, is assigned to the remaining wheel brakes R, to the wheel brake $R_{VL}$ of the left-hand front wheel and $R_{HR}$ of the right-hand rear wheel of the vehicle.

During a brake-by-wire braking process, the actuating cylinder Z is normally hydraulically decoupled from the wheel brakes R. Instead, the braking operation at the individual wheel brakes R occurs via a generation of external power, in this case via a hydraulic pressure source D which is controlled by an electric motor M and via a control unit. This means that the muscle power of the driver by actuation of the brake pedal P acts only as a fall-back level in the event of a failure of the brake-by-wire.

Here, the vehicle is operable in a manual and in an autonomous driving mode.

During a manual driving operation, when the driver themself performs the driving and thus braking task, the brake pedal P, when it is actuated by the driver, acts via a pedal rod on an actuating cylinder Z. Here, firstly, the deceleration demand of the driver is detected electronically via a suitable sensor arrangement S1, and secondly, a hydraulic actuation of a pedal feel simulator S is preferably performed. The pedal feel simulator S may, for example, likewise constitute a pressure cylinder or else a spring arrangement which, in a brake-by-wire operating mode, provides the driver with feedback or a resistance for the purposes of feedback of the brake actuation. The pressure acting in a simulator chamber is in this case hydraulically independent of a pressure level in the wheel brakes R, which is set by a, for example, electric-motor-powered drive M.

The actual brake pressure required for the braking of the wheel brakes R is generated via the hydraulic pressure source D or pressure provision device, which is controlled in open-loop or closed-loop fashion by the electronic open-loop and closed-loop control unit, and a pressure valve arrangement $V_{P2}$, $V_{P1}$ of the brake system.

Here, in particular, an electric motor M serves as drive or as pump.

In the autonomous driving mode of the vehicle, if the vehicle (at least partially) performs the driving task, the brake-by-wire closed-loop pressure control is performed in a manner dependent on data from a multiplicity of different vehicle sensor arrangements.

If the brake pedal is now brought into an actuated position, according to the above-described method implementation mode of operation of the brake system, a pedal travel sensor arrangement S1 would detect the brake pressure desired by the driver and a control unit would initiate a braking process at the wheel brakes R through suitable control of the hydraulic pressure source D. The brake system would, in the normal situation, initiate a braking operation.

In this case, however, the driver actuates the brake pedal P without a braking intervention being desired. Instead, it is provided that the brake pedal P is brought into an actuated position such that, while the vehicle is in an autonomous driving mode, the driver is provided with more legroom in the footwell.

For this purpose, in a first step as illustrated in FIG. 1, the floating-piston circuit SK is hydraulically decoupled from the actuating cylinder via the valve $V_{B1}$. The pressure-rod circuit DK is simultaneously opened by electrical energization of the valve $V_{B2}$, wherein a hydraulic connection is produced between the first pressure chamber DK and the left-hand rear-wheel brake $R_{HL}$ and the right-hand front-wheel brake $R_{VR}$ of the vehicle. The outlet valves $V_{A2}$ to the left-hand rear-wheel brake $R_{HL}$ and to the right-hand front-wheel brake R are opened, such that hydraulic fluid which flows from the first pressure chamber in the direction of the wheel brakes $R_{HL}$, $R_{VR}$ as a result of the actuation of the brake pedal P is discharged through the outlet valves $V_{A2}$ into the brake fluid vessel B. The second pressure chamber SK (the floating-piston circuit) is decoupled from the wheel brakes, for which reason no braking operation occurs at the left-hand front-wheel brake $R_{VL}$ and at the right-hand rear-wheel brake $R_{HR}$.

Thus, no noticeable vehicle deceleration occurs upon actuation of the brake pedal P.

Figure 2:
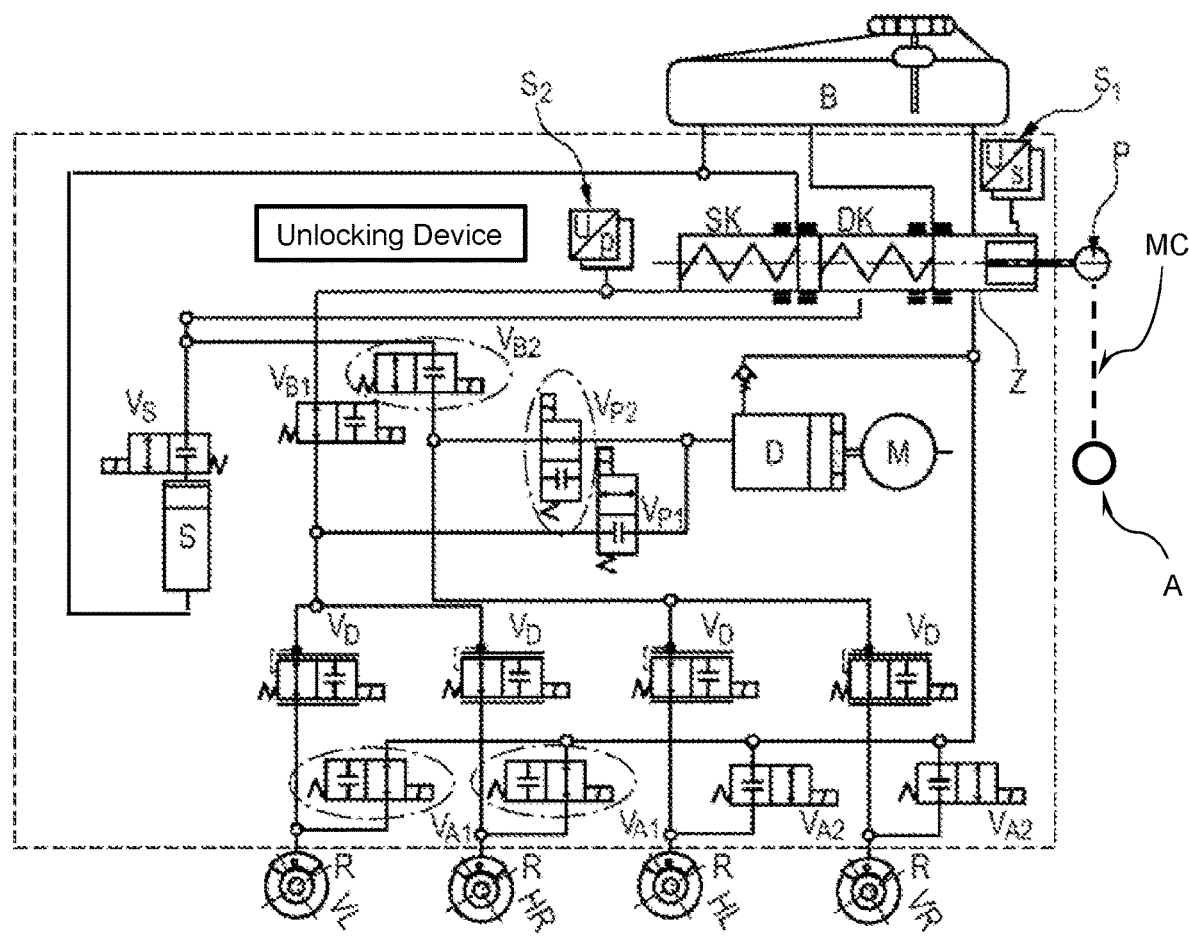

In a further step, after the first pressure chamber DK of the actuating cylinder Z has been evacuated as can be seen in FIG. 1, the pressure-rod circuit DK is, as can be seen in FIG. 2, now hydraulically decoupled by closure of the valve $V_{B2}$, such that, in the event of further actuation of the brake pedal P, no vehicle deceleration caused by a pressure build-up in the second pressure chamber SK occurs. For the evacuation of the second pressure chamber SK, the valve $V_{B1}$ is therefore opened, and the floating-piston circuit SK is thus produced. The outlet valves $V_{A1}$ of the left-hand front-wheel brake $R_{VL}$ and of the right-hand rear-wheel brake $R_{HR}$ are opened. In the case of further actuation of the brake pedal P into an actuated position, the hydraulic fluid in the floating-piston circuit SK now flows in the direction of the two wheel brakes $R_{VL}$ and $R_{HR}$ through the outlet valves $V_{A1}$ into the brake fluid vessel B. No noticeable vehicle deceleration occurs via the second brake circuit, the floating-piston circuit SK.

In order that a braking operation can occur at any time during the actuation of the brake pedal P into an actuated position, always at least two wheel brakes, in the first step (illustrated in FIG. 1) the wheel brakes $R_{HR}$ and $R_{VL}$ and in the second step (illustrated in FIG. 2) the wheel brakes $R_{HL}$ and $R_{VR}$, are controllable and actuatable via the hydraulic pressure source D. For this purpose, in the respective steps (FIG. 1 and FIG. 2), depending on which pressure chamber is presently being evacuated, the connection to the respective wheel brakes R and to the hydraulic pressure source D is produced via a valve $V_{P2}$ (in step 2) or $V_{P1}$ (in step 1). At those wheel brakes R at which a braking operation is to occur (depending on which step of the evacuation the actuating cylinder finds itself), the outlet valves $V_{A1}$ (in step 1) and $V_{A2}$ (in step 2) are closed, such that hydraulic fluid can flow from the hydraulic pressure source D into the respective wheel brake R.

It can thus be ensured that, during the entire process of the evacuation of the two pressure chambers DK, SK of the actuating cylinder Z, autonomous braking of the vehicle via at least two wheel brakes R can be performed.

After the two steps (step 1 in FIG. 1 and step 2 in FIG. 2) of the evacuation of the actuating cylinder Z have taken place and the brake pedal P is in an actuated position, it is provided that the brake pedal P is held in said actuated position, via a suitable locking mechanism, during the entire period in which the vehicle is in the autonomous driving mode.

If the vehicle changes back into a manual driving mode, then the arresting of the brake pedal P in the actuated position can be released. A spring arrangement which is, for example, already present in the actuating cylinder Z can then ensure the resetting force required for the movement of the brake pedal P into a non-actuated position. The valves $V_{B2}$ and $V_{B1}$ are then closed, and the driver can then again operate the brake system by actuating the brake pedal P in the conventional manner.

It is advantageously to be noted here that, during the evacuation process of the actuating cylinder Z or during the actuation of the brake pedal in accordance with the stated steps 1 and 2, the control unit takes into consideration the fact that the travel sensor S1 for detecting the brake pedal travel and the plausibility diagnostic means S2 for comparing the desired pressure with possible disturbance variables are suppressed or deactivated. After the method has been completed and the brake pedal is brought into a non-actuated position again, the sensor arrangements S1 and S2 should then be functional. The valve VS for producing a hydraulic connection between the brake force simulator S and the brake circuits SK, DK remains closed during the entire method according to FIG. 1 and FIG. 2.

What is claimed is:

1. A method for operating a vehicle with an electrohydraulic brake system comprising a first and second hydraulic brake circuit that are each assigned to hydraulically enable at least one respective wheel brake of the vehicle, the method comprising:
hydraulically decoupling the first brake circuit of the brake system from the second brake circuit;
separating the second brake circuit from an actuating cylinder that is actuatable by a brake pedal, wherein the actuating cylinder comprises first and second pressure chambers assigned to the first brake circuit and second brake circuit, respectively;
producing a hydraulic connection between the actuating cylinder and the at least one wheel brake assigned to the first brake circuit;
separating the hydraulic connection of the first brake circuit from a hydraulic pressure source that is controllable by a control unit;
switching an outlet valve assigned to the at least one wheel brake of the first brake circuit into an opened position, in which the outlet valve produces a hydraulic connection between the at least one wheel brake of the first brake circuit and a brake fluid vessel;
conveying hydraulic brake fluid from only the first pressure chamber of the actuating cylinder via the first brake circuit and via the opened outlet valve at the at least one wheel brake into the brake fluid vessel;
evacuating hydraulic fluid from only the first pressure chamber of the actuating cylinder, wherein
the vehicle is operable in a manual and an autonomous driving mode; and
during an autonomous driving mode, the brake pedal is brought into an at least partially actuated position; and
evacuating the second pressure chamber of the actuating cylinder via the following steps:
separating the second brake circuit of the brake system from the first brake circuit;
separating the first brake circuit from the actuating cylinder that is actuatable by the brake pedal;
producing a hydraulic connection between the actuating cylinder and the at least one wheel brake assigned to the second brake circuit;
separating the hydraulic connection of the second brake circuit from a hydraulic pressure source that is controllable by a control unit;
switching an outlet valve assigned to the at least one wheel brake of the second brake circuit into an opened position, which outlet valve produces a hydraulic connection between the at least one wheel brake and a brake fluid vessel;
conveying hydraulic brake fluid from only the second pressure chamber of the actuating cylinder via the second brake circuit and via the opened outlet valve at the at least one wheel brake into the brake fluid vessel; and
evacuating hydraulic fluid from only the second pressure chamber of the actuating cylinder.

2. The method according to claim 1, wherein the brake pedal is arrested in the actuated position.

3. The method according to claim 1, wherein the first and second brake circuits are separated from one another by a circuit-separating valve.

4. The method according to claim 1, wherein in the case of a braking intervention, during the actuation of the brake pedal into an actuated position, the second brake circuit is hydraulically coupled to the hydraulic pressure source that is controllable by a control unit.

5. The method according to claim 1, wherein in the event of a manual driving mode being detected, the brake pedal is brought back into a non-actuated position again.

6. The method according to claim 1, wherein the brake pedal is brought back into its non-actuated position by a spring.

7. The method according to claim 1, wherein the brake pedal is brought into an actuated position with a maximum speed such that no noticeable vehicle deceleration occurs.

8. An electrohydraulic brake system of a vehicle operable both in a manual and in an autonomous driving mode, comprising:
a first and a second hydraulic brake circuit hydraulically decouplable from one another by a circuit-separating valve, each being assigned to enable at least one respective wheel brake of the vehicle;
an actuating cylinder actuatable by a brake pedal;
a hydraulic pressure source controllable by an electronic open-loop and/or closed-loop control unit by a pressure in which the at least one wheel brake of one of the first and second hydraulic brake circuits is controllable in an autonomous driving mode of the vehicle;
an actuating valve to produce a hydraulic connection between the actuating cylinder and two or more wheel brakes assigned to a common brake circuit of the first and second hydraulic brake circuits, and
a brake pedal actuator or a driver by which the brake pedal is movable into an at least partially actuated position, wherein
the wheel brakes of the vehicle are assigned to one outlet valve that is controllable by the electronic open-loop and/or closed-loop control unit,
in the opened state, the one outlet valve produces a hydraulic bypass of brake fluid into a brake fluid vessel, and
the brake pedal is configured to be mechanically coupled and decoupled to an accelerator pedal such that, in the autonomous driving mode of the vehicle, the accelerator pedal is likewise held in an actuated position.

9. The electrohydraulic brake system according to claim 8, wherein
the first brake circuit is formed:
by rear wheel brakes of the vehicle; or
by front wheel brakes of the vehicle; or
by a front wheel brake on the left-hand vehicle side and a rear wheel brake on the right-hand vehicle side; or
by a front wheel brake on the right-hand vehicle side and a rear wheel brake on the left-hand vehicle side; and
the second brake circuit is formed by the remaining wheel brakes.

10. The electrohydraulic brake system according to claim 8, wherein
the actuating cylinder comprises a first and a second pressure chamber, wherein
the first brake circuit is assigned to the first pressure chamber and the second brake circuit is assigned to the second pressure chamber.

11. The electrohydraulic brake system according to claim 8, comprising:
a manually-actuatable unlocking device by which the brake pedal situated in an at least partially actuated position is unlockable into a non-actuated position.

12. A method for operating a vehicle with an electrohydraulic brake system comprising a first and second hydraulic brake circuit that are each assigned to hydraulically enable at least one respective wheel brake of the vehicle, the method comprising:
hydraulically decoupling the first brake circuit of the brake system from the second brake circuit;
separating the second brake circuit from an actuating cylinder that is actuatable by a brake pedal, wherein
the actuating cylinder comprises first and second pressure chambers assigned to the first brake circuit and second brake circuit, respectively;
switching an outlet valve assigned to the at least one wheel brake of the first brake circuit into an opened position, in which the outlet valve produces a hydraulic connection between the at least one wheel brake of the first brake circuit and a brake fluid vessel;
evacuating hydraulic brake fluid from only the first pressure chamber of the actuating cylinder via the first brake circuit and via the opened outlet valve at the at least one wheel brake into the brake fluid vessel; and
evacuating the second pressure chamber of the actuating cylinder via the following steps:
separating the second brake circuit of the brake system from the first brake circuit;
separating the first brake circuit from the actuating cylinder that is actuatable by the brake pedal;
producing a hydraulic connection between the actuating cylinder and the at least one wheel brake assigned to the second brake circuit;
separating the hydraulic connection of the second brake circuit from a hydraulic pressure source that is controllable by a control unit;
switching an outlet valve assigned to the at least one wheel brake of the second brake circuit into an opened position, which outlet valve produces a hydraulic connection between the at least one wheel brake and a brake fluid vessel;
conveying hydraulic brake fluid from only the second pressure chamber of the actuating cylinder via the second brake circuit and via the opened outlet valve at the at least one wheel brake into the brake fluid vessel; and
evacuating hydraulic fluid from only the second pressure chamber of the actuating cylinder.

* * * * *